US008370016B2

(12) United States Patent
Webster et al.

(10) Patent No.: US 8,370,016 B2
(45) Date of Patent: Feb. 5, 2013

(54) OBD II READINESS MONITOR TOOL APPARATUS AND METHOD

(75) Inventors: Thomas Webster, Kalamazoo, MI (US); Daniel Sampson, Kalamazoo, MI (US); Richard Mattox, Portage, MI (US); Matthew Koran, Medina, OH (US); Robert Roberts, South Euclid, OH (US); Hamid Namaky, South Russell, OH (US)

(73) Assignee: SPX Corporation, Charolotte, NC (US)

( * ) Notice: Subject to any disclaimer, the term of this patent is extended or adjusted under 35 U.S.C. 154(b) by 1440 days.

(21) Appl. No.: 11/522,347

(22) Filed: Sep. 18, 2006

(65) Prior Publication Data

US 2007/0073459 A1 Mar. 29, 2007

Related U.S. Application Data

(60) Provisional application No. 60/719,598, filed on Sep. 23, 2005.

(51) Int. Cl.
*G01M 17/00* (2006.01)
*G06F 19/00* (2011.01)

(52) U.S. Cl. ..................... 701/29.1; 701/31.1; 701/31.4; 701/33.2; 701/33.5; 701/34.4; 340/438; 340/439

(58) Field of Classification Search .................... 701/29, 701/35, 29.1, 29.4, 29.8, 30.7, 31.4, 33.2, 701/34.4, 114, 109; 340/438, 439, 441
See application file for complete search history.

(56) References Cited

U.S. PATENT DOCUMENTS 4,638,428 A 1/1987 Gemma et al.
5,319,785 A 6/1994 Thaller
5,671,141 A * 9/1997 Smith et al. .................. 701/33.6
5,916,286 A * 6/1999 Seashore et al. ............. 701/33.2
6,032,088 A * 2/2000 Feldmann et al. ........... 701/29.6
6,356,823 B1 * 3/2002 Iannotti et al. ............... 701/32.7
6,525,340 B2 2/2003 Colavito et al.
6,529,808 B1 * 3/2003 Diem ........................... 701/31.5
6,636,790 B1 * 10/2003 Lightner et al. ............. 701/31.5
6,640,166 B2 * 10/2003 Liebl et al. ................... 701/29.1
6,640,268 B1 10/2003 Kumar
6,687,584 B2 * 2/2004 Andreasen et al. .......... 701/29.6
6,810,309 B2 10/2004 Sadler et al.
6,879,894 B1 * 4/2005 Lightner et al. ............. 701/31.4
6,928,348 B1 8/2005 Lightner et al.
6,931,309 B2 * 8/2005 Phelan et al. ..................... 701/1
6,941,203 B2 9/2005 Chen
6,965,816 B2 11/2005 Walker
6,993,421 B2 1/2006 Pillar et al.
7,010,416 B2 * 3/2006 Lewis ........................... 701/109
7,012,512 B2 * 3/2006 St. Denis ...................... 340/438

(Continued)

OTHER PUBLICATIONS

Owner's Manual for Equus Products, Inc.'s Innova® Digital OBDII Code Reader, 2001, whole document.

(Continued)

*Primary Examiner* — Thomas Black
*Assistant Examiner* — Wae Louie
(74) *Attorney, Agent, or Firm* — Baker & Hostetler LLP

(57) ABSTRACT

An OBDII device and method and system which includes an inexpensive, user friendly way to determine a vehicle's readiness status for emissions testing. An audible or visual indication that may or may not be wirelessly connected to the tool is provided to alert the repair shop technician or driver that the vehicle has completed its drive cycle and may now be tested for compliance with state and federal emissions laws. The device also includes the ability to prevent the tool from discharging a power source of the vehicle when the device is coupled to the vehicle.

19 Claims, 6 Drawing Sheets

U.S. PATENT DOCUMENTS

| | | | | |
|---|---|---|---|---|
| 7,089,096 | B2 | 8/2006 | Liebl et al. | |
| 7,089,127 | B2 | 8/2006 | Thibedeau et al. | |
| 7,103,460 | B1 | 9/2006 | Breed | |
| 7,184,866 | B2 | 2/2007 | Squires et al. | |
| 7,305,289 | B2 * | 12/2007 | Gessner et al. | 701/34.3 |
| D558,621 | S * | 1/2008 | Rich et al. | D10/78 |
| D560,129 | S * | 1/2008 | Rich et al. | D10/78 |
| D560,527 | S * | 1/2008 | Rich et al. | D10/78 |
| 7,320,312 | B2 * | 1/2008 | Takahashi | 123/446 |
| 7,328,093 | B1 * | 2/2008 | Gessner et al. | 701/33.6 |
| 7,529,643 | B2 * | 5/2009 | Nyberg | 702/182 |
| 7,577,503 | B2 * | 8/2009 | Bertosa et al. | 701/31.4 |
| 7,634,351 | B2 * | 12/2009 | Diem | 701/114 |
| 7,650,210 | B2 * | 1/2010 | Breed | 701/31.9 |
| 7,657,354 | B2 * | 2/2010 | Breed et al. | 701/45 |
| 7,672,756 | B2 * | 3/2010 | Breed | 701/1 |
| 2002/0004694 | A1 | 1/2002 | McLeod et al. | |
| 2002/0007237 | A1 * | 1/2002 | Phung et al. | 701/33 |
| 2002/0059075 | A1 | 5/2002 | Schick et al. | |
| 2002/0077781 | A1 * | 6/2002 | Liebl et al. | 702/183 |
| 2003/0130774 | A1 | 7/2003 | Tripathi et al. | |
| 2005/0043868 | A1 * | 2/2005 | Mitcham | 701/29 |
| 2005/0187677 | A1 | 8/2005 | Walker | |
| 2005/0192727 | A1 | 9/2005 | Shostak et al. | |
| 2005/0273218 | A1 | 12/2005 | Breed et al. | |
| 2006/0026017 | A1 | 2/2006 | Walker | |
| 2006/0095233 | A1 | 5/2006 | Carr et al. | |
| 2006/0206246 | A1 | 9/2006 | Walker | |
| 2006/0224283 | A1 | 10/2006 | Fussey et al. | |
| 2006/0247843 | A1 | 11/2006 | Lewis, Jr. | |
| 2007/0073459 | A1 * | 3/2007 | Webster et al. | 701/29 |

OTHER PUBLICATIONS

Equus Monitor Newsletter—The Test Equipment and Gauge Authority, Spring 2001, whole document.

Commonwealth of Massachusetts Registry of Motor Vehicles, “Mass99 Specifications,” Version 1.7.3, Nov. 5, 2002, pp. 1-342.

* cited by examiner

OBD II READINESS MONITOR TOOL APPARATUS AND METHOD

CROSS-REFERENCE TO RELATED APPLICATIONS

This application claims priority to U.S. Provisional Patent Application No. 60/719,598 entitled, "OBD II READINESS MONITOR TOOL APPARATUS AND METHOD," filed Sep. 23, 2005, which is hereby incorporated by reference in its entirety.

FIELD OF THE INVENTION

The present invention relates generally to automotive vehicles. In particular, it relates to an On-Board Diagnostic II apparatus, and method that includes a discharge prevention and charging circuits.

BACKGROUND OF THE INVENTION

Recently manufactured vehicles are equipped with a special system called On-Board Diagnostic II (OBD II). OBD II monitors all engine and drive train sensors and actuators for shorts, open circuits, lazy sensors and out-of-range values as well as values that do not logically fit with other power train data. Thus, OBD II keeps track of all of the components responsible for emissions and when one of them malfunctions, it signals the vehicle owner by illuminating a Maintenance Indicator Lamp (MIL), such as a check engine indicator. It also stores Diagnostic Trouble Codes (DTCs) designed to help a technician find and repair the emission related problem. OBD II also specifies the means for communicating diagnostic information to equipment used in diagnosing, repairing and testing the vehicle.

An illuminated MIL means that the OBD II system has detected a problem that may cause increased emissions. A blinking MIL indicates a severe engine misfire that can damage the catalytic converter. The MIL is reserved for emission control and monitored systems and may not be used for any other purpose. The "Check Engine," "Service Engine Soon" or other "engine symbol" message is typically used as an MIL indicator.

The Clean Air Act of 1990 requires inspection and maintenance (I/M) programs to incorporate OBD II testing as part of a vehicle's emissions inspection program. When fully implemented, 1996 and newer model year vehicles registered in a required emission test area must be tested annually. If DTCs are present, or the diagnostic monitor software has not adequately tested the vehicle's emission control systems, the vehicle fails the emissions test. Otherwise, the vehicle passes the emissions test.

In order for a vehicle to pass the OBD II emissions tests, the vehicle under test (VUT) must report that all pertinent (as defined by each state) diagnostic monitors have completed their tests of the vehicle system. Diagnostic monitors that have completed their tests are said to be in a "Ready" state. Diagnostic monitors that have not completed their tests are said to be in a "Not Ready" state. Checking the readiness state of the diagnostic monitors via OBD II was incorporated into emissions testing to prevent owners from attempting to pass vehicles not in compliance by simply clearing the vehicle's Diagnostic Trouble Codes and then quickly retesting the vehicle before the root problem was again detected by the vehicle's on board computer. Clearing the DTCs on a vehicle also sets all of the monitors to the "Not Ready" state. Until the vehicle has been driven under the proper conditions for all of the monitors to execute their tests, the vehicle will not be ready for an emissions test. The OBD II system can set either a "Soft" or "Hard" DTC in the vehicle's memory. "Soft" codes are temporary and can be cleared by a pre-set number of trips (key on, engine on cycles) without a recurrence of the failure. "Hard" codes are set in permanent memory and can only be cleared by a scan tool.

The readiness state of the diagnostic monitors of the OBD II system indicates that emission system components have been checked. If a particular monitor is set to "Ready," the monitor has checked its assigned components and systems. If a problem is found, a DTC is set, and a technician can retrieve the code. When all of the monitors on a vehicle are "Ready," the vehicle is ready for an emissions test. If, at that time, no DTCs are present, the vehicle should pass the emissions testing.

Unlike DTCs, the readiness state of the diagnostic monitors cannot be manipulated via a scan tool, rather their status is altered by a Drive Cycle, which is a series of specific vehicle operating conditions that enable the diagnostic monitors to test the vehicle's emissions control hardware. As each monitor completes its testing, its readiness state will be set to "Ready." An example of a simple Drive Cycle is where the vehicle's engine is started, and the vehicle is driven for seven minutes. Then the vehicle is driven in stop-and-go traffic for six minutes including one minute of idling. After which, the vehicle is accelerated to forty-five miles per hour and maintained at that speed for one minute.

Repair shops and drivers may not be aware of when the vehicle is "Ready" to be tested for emissions, or when the required Drive Cycle has been completed in order to properly test the vehicle's emissions. Therefore, repair facilities need an inexpensive tool that enables either untrained personnel (such as a typical driver) or trained repair facility personnel, to determine the status of the OBD II diagnostic monitors while operating the vehicle through normal driving conditions. The driver has to be careful not to drain the vehicle's battery as the tool can use the vehicle's battery as its power source. In addition, repair facilities need to encourage their client to return to their shop after the readiness monitors have been reset to the "Ready" position in order to verify the repair and/or complete the emissions testing.

Accordingly, the tool should simplify the process of determining the readiness state of the readiness monitors in a vehicle by indicating the status of all emission related diagnostic monitors of the vehicle. In addition, a tool is desired that alleviates the need to tie up a shop's expensive scan tool or skilled technician's time to determine the vehicle's readiness status for emissions testing. The tool should also not drain the vehicle's battery when used. Accordingly, it is desirable to provide an apparatus and method that is an inexpensive and easy way of indicating a vehicle's readiness status for emissions testing and also not drain the vehicle's battery.

SUMMARY OF THE INVENTION

The foregoing needs are met, to a great extent, by the present invention, wherein in one aspect an apparatus is provided that in some embodiments inexpensively and simply provides an indication that, based on the states of all of the pertinent diagnostic monitors, the vehicle either is or is not "Ready" for an emissions test.

In accordance with one embodiment of the present invention, an apparatus for determining a vehicle's readiness status for emissions testing is provided and can include a processor that can be operably coupled to a vehicle diagnostic connector to determine a status of at least one readiness monitor, at least one vehicle communication protocol interface operatively coupled to the processor and can allow the processor to communicate with the vehicle, a voltage detection circuit to detect a voltage of a power source in the vehicle, a housing surrounding the processor, at least one vehicle communication protocol interface, and the voltage detection circuit, and an indicator disposed on the housing for indicating the vehicle's readiness status for emission testing.

In accordance with another embodiment of the present invention, a method of preventing a diagnostic tool from discharging a battery of a vehicle is provided and can include coupling the diagnostic tool that can determine the vehicle's readiness status for emissions testing to a data link connector of the vehicle, determining a voltage of the vehicle's battery with a voltage detection circuit of the diagnostic tool, comparing the voltage of the vehicle's battery against a threshold voltage with the voltage detection circuit of the diagnostic tool, and providing power to a processor of the diagnostic tool when the voltage of the vehicle's battery is above the threshold voltage.

In accordance with yet another embodiment of the present invention, a device for determining a vehicle's readiness status for emissions testing is provided and can include a means for processing that can be operably coupled to a vehicle diagnostic connector to determine the status of at least one readiness monitor, means for communicating at least one vehicle communication protocol operatively coupled to the means for processing and can allow the means for processing to communicate with the vehicle, a means for detecting the voltage of a power source in the vehicle, a means for housing surrounding the means for processing, the means for communicating, and the means for detecting, and a means for indicating disposed on the housing, and for indicating the vehicle's readiness status for emission testing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present invention includes a vehicle device that monitors the status of the OBD II readiness monitors to determine if the vehicle is "Ready" for an emissions test. The device will indicate to a driver that the vehicle is ready for emissions testing by alerting the user via, for example, audio and/or visual signals or other alert indicators. Checking the readiness state of the diagnostic monitors allows a driver to save time by not having to return the vehicle for testing only to find out that the vehicle is still not ready for emissions testing.

Figure 1:
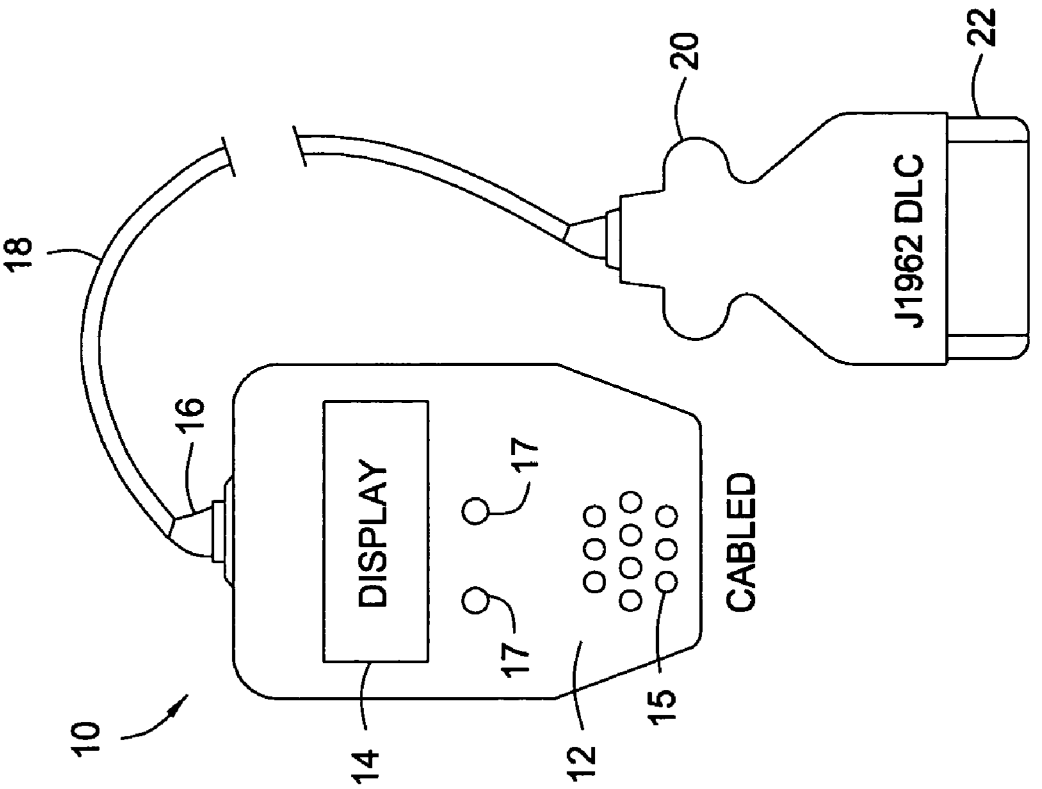
FIG. 1 is a plan view illustrating a cabled apparatus according to an embodiment of the invention.

The invention will now be described with reference to the drawing figures, in which like reference numerals refer to like parts throughout. FIG. 1 is a plan view illustrating a cabled device 10 according to an embodiment of the invention. The tool 10 includes generally, a housing 12 and a display 14. The housing 12 has an opening 16 for coupling a cable 18 to the housing 12. The display can be any type of display, such as an LCD, that provides any type of information, such as DTCs or that the vehicle is ready or not ready for emissions testing. The cable 18 couples the tool 10 to a connector 20 having an interface 22 that connects to a vehicle's onboard computer (not shown). The cable can be any length desired so that it allows the housing to be at any length away from the vehicle's computer as desired. In addition, a beeper 15 and an indicator 17 are disposed on the housing 12 to indicate when the vehicle is ready for emissions testing. The interface 22 can be any interface that interfaces with a vehicle, including a Data Link Connector (DLC), such as, for example, an SAE J1962 connector.

Figure 2:
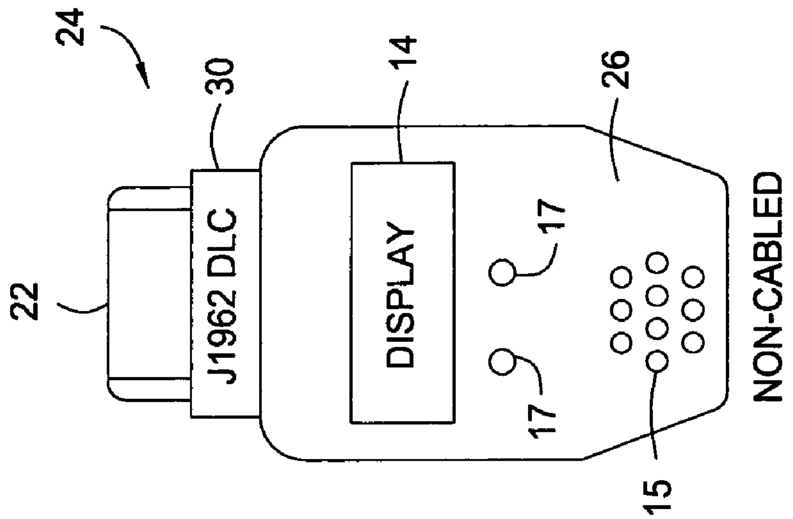
FIG. 2 is a plan view of a non-cabled apparatus according to another embodiment of the invention.

FIG. 2 is a plan view of a non-cabled tool 24 according to another embodiment of the invention. The non-cabled tool 24 has a housing 26 with a display 14. The housing 26 has an opening 30 for affixing the connector 22 that couples to a vehicle's onboard computer (not shown). Like tool 10, tool 24 also has the beeper 15, indicator 17, and the display 14 disposed on the housing 26. The non-cabled embodiment provides a compact device for a true one-piece device and compact storage. This embodiment can also be cheaper to produce due to decreased expense of not having a cable. Although both the beeper 15 and the indicator 17 are illustrated, only one or both may be used by the tool 10 or 24 and still be within the spirit of the present invention.

Internally, the tools 10 and 24 include a processor, memory, random access memory (RAM), communication circuitry and a power supply. The processor is configured with software enabling it to determine from the OBD II system whether the appropriate Drive Cycle has been completed and whether the monitors are set to "Ready" in order to perform the emissions test.

Figure 3:
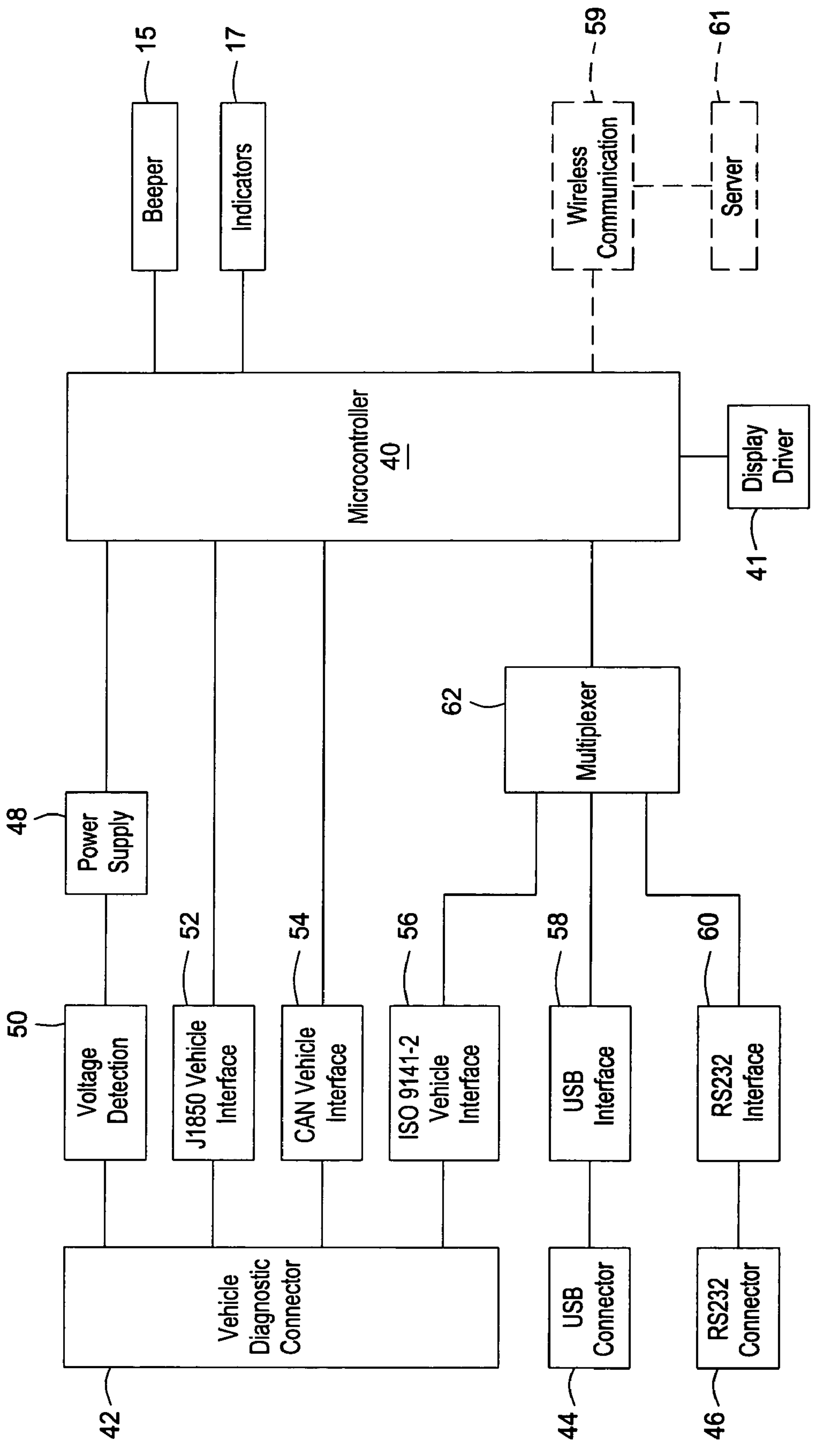
FIG. 3 is a schematic illustration of the tools of FIGS. 1 and 2.

FIG. 3 is a schematic illustration of the tools 10 and 24 of FIGS. 1 and 2. In particular, the tools 10 and 24 have a microcontroller or processor 40. The processor 40 is coupled to a vehicle diagnostic connector 42, a USB (Universal Serial Bus) connector 44, and an RS232 connector 46. In an alternative embodiment, the processor 40 can be a Field Programmable Gate Array (FPGA) or any other type of processor or controller.

The processor 40 is coupled to the vehicle diagnostic connector 42 through an SAE J1850 vehicle interface 52, a CAN (Controlled Area Network) vehicle interface 54 and an ISO 9141-2 vehicle interface 56. The processor is coupled to the ISO 9141-2 vehicle interface 56 by way of a multiplexer 62. The J1850 vehicle interface 52 includes the hardware and/or software that allow the processor 40 to communicate with a vehicle equipped with J1850 communication protocol. The CAN vehicle interface 54 includes the hardware and/or software that allow the processor to communicate with a vehicle equipped with CAN communication protocol. Additionally, the ISO 9141-2 vehicle interface includes the hardware and/or software that allow the processor 40 to communicate with a vehicle equipped with ISO 9141-2 communication protocol. A person skilled in the art will recognize that other vehicle communication protocols may also be utilized and that their respective interfaces are well within the embodiments of this invention.

The processor 40 couples to the USB connector 44 using a USB interface 58 and couples to the RS232 connector 46 through an RS232 interface 60. The processor 40 couples to the USB interface 58 and the RS232 interface 60 via the multiplexer 62. The USB connector 44 allows the tool to communicate with another computing device, such as a computer, Personal Digital Assistant (PDA) or a scan tool, while the RS232 can be used to communicate with other communication equipment, including computing devices. The processor also couples with a display driver 41 to drive the display 14.

Further, a power supply 48 powers the processor 40 and the tool 10 or 24. The power supply 48 may be provided by the VUT or another power source, such as a battery (external or internal to the housing). The processor 40 is coupled to the power supply 48 through a voltage detection device 50. The voltage detection device 50 detects whether operating the full circuitry of the tool and/or charging the tool's internal battery, risks significantly discharging the vehicle's battery. When the vehicle's battery would be significantly drained by operating the full circuitry of the tool, the tool 10 or 24 is powered down and only the low-power voltage detection circuitry is operational. The processor 40 is also coupled to the beeper 15 and indicator 17 (discussed in greater detail below).

A device that uses power provided by the vehicle may drain the vehicle's battery unless the device is powered off when the vehicle engine is not running. In an embodiment of the present invention, tool 10 or 24 may be left coupled to the vehicle's computer even when the vehicle engine is not running without draining the vehicle's battery. The voltage detection device 50 may have a predetermined threshold of voltage for powering on, such as, for example 12.7 volts, the voltage of a fully charged battery. When the vehicle engine is started, the charging system may apply approximately 13.5 volts to the battery. This voltage keeps the battery fully charged and sometimes in an over charged state.

The voltage detection device 50 detects when the battery voltage is greater than 12.7 volts, the detection threshold, and the tool 10 or 24 powers on. It stays on while the vehicle engine is running and therefore, is powered by the vehicle charging system or the vehicle's battery. When the engine is turned off, the battery voltage will be approximately 13.5 volts. However, the voltage begins to decrease to the fully charged voltage of approximately 12.7 volts. While the battery's voltage decreases, the tool 10 or 24 is still powered on and receives power from the vehicle's battery. The time required for the decrease in voltage from 13.5 to 12.7 volts depends on various factors such as the strength of the battery, how long the vehicle was running, the battery temperature, etc. Time durations for this transition may be between approximately one to thirty minutes.

When the voltage reaches the detection threshold, the tool 10 or 24 powers off. Incidentally, the power drawn by the voltage detection device 50 may be negligible and does not discharge the vehicle battery. Thus, the tool 10 or 24 is powered on when the vehicle engine is (or has recently been) running and is powered off when the vehicle's engine is not (or has not recently been) running. However, in other embodiments of the invention, the tool 10 or 24 remains powered on for a certain amount of time after the vehicle powers off, so that the user can inspect the indicators 15 or 17 to ascertain whether the vehicle is "Ready."

In the event that the vehicle battery is weak and the time for the vehicle's battery to return to the fully charged state from the over charged state, is short, the tool 10 or 24 may be configured to remain powered on for a particular period of time beyond the time the vehicle powers off. For example, the tool 10 or 24 may remain powered on for approximately two minutes. This permits the operator to inspect the tool 10 or 24 even though the vehicle has powered off. Further, this time delay embodiment also does not significantly discharge the vehicle battery.

Thus, the tool 10 or 24 may also be plugged into the vehicle even when the vehicle's engine is not running without discharging the vehicle battery. The tool 10 or 24 is capable of turning on only when there is no risk of battery drain. When there is a risk of battery drain, the tool enters the stand-by mode where it requires very little or no power. When the tool 10 or 24 is operating, it draws its power from the vehicle's battery and/or charging system. Alternatively, the tool 10 or 24 may be powered by another source internal or external to the housing, such as the tool's own battery.

In a further embodiment of the present invention, the processor 40 may also be coupled to a wireless communication device 59 which may communicate with a server 61. In this manner, the processor 40 may communicate with a remote indicator that the vehicle is "Ready" for emissions testing. Thus, the server 61 may be used to send an email, text message or the like to any computing device, such as a PDA, PC or cellular telephone indicating, for example, that the vehicle is ready for emissions testing. The server, which is a computing device, can itself indicate that the vehicle is ready for emissions testing via the methods described herein. Additionally, software updates, reprogramming, and functional aspects of the tool can be controlled via the wireless communication.

OBDII devices have the ability to communicate with the vehicle using one of the many different vehicle communication protocols that may exist in the vehicle's control system. Although, it should be transparent to the technician, not all devices communicate with all vehicles. Thus, a technician must own several different scan tools to perform engine performance diagnostics on a variety of vehicle makes. This can be an expensive endeavor. In this embodiment, all communication protocols can be utilized with the tool to communicate with the vehicle.

The tools 10 and 24 may be reprogrammed or configured by a technician using a computing device such as a personal computer, PDA or a scan tool with configuration software. For instance, if the technician wants to check the status of only a few of the 11 diagnostic monitors, the technician can configure the tool 10 or 24 to do so. New or additional information can be uploaded to the tool 10 or 24 in a similar fashion. The tool 10 or 24 simply needs to be connected to a computing device, such as a personal computer (PC), PDA or scan tool using a Universal Serial Bus (USB) interface 58, a RS232 serial interface 60, a wireless communication or an infrared connection. Any means of connecting the tool may be used including wireless and wired connections or other communication protocols are within the spirit of the invention.

Figure 4:
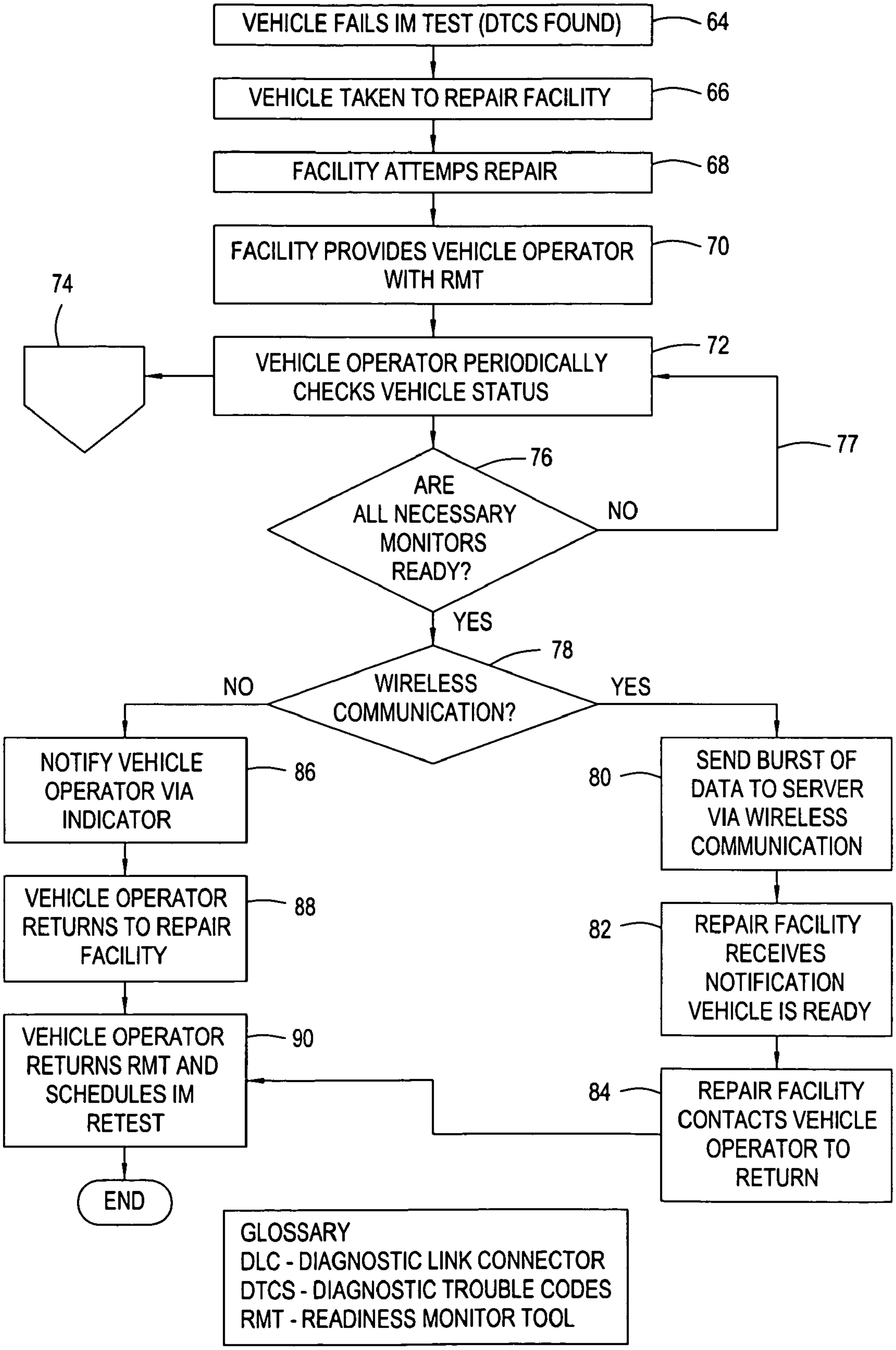
FIG. 4 is a flowchart illustrating steps in accordance with one embodiment of the method of the present invention.

FIG. 4 is a flowchart illustrating steps in accordance with one embodiment of the method of the present invention. The vehicle fails the I/M testing and DTCs are found at step 64. When the vehicle fails, the vehicle is taken to the repair facility at step 66 and the repair facility attempts to repair the vehicle at step 68. The DTCs are erased, which also set the readiness state of all of the diagnostic monitors to "Not Ready." The repair facility may be located at the same place as where the emission test is conducted. The facility then provides the vehicle operator with a readiness monitor tool 10 or 24 at step 70. The vehicle operator uses the tool 10 or 24 and periodically checks the "Ready" status at step 72 to determine if the vehicle has completed its Drive Cycle and whether the monitors are "Ready." If the necessary monitors are not ready, then proceed to step 77 and return to step 72 where the operator periodically checks until the monitors are ready. The tool can also periodically query the monitors at certain time intervals to determine if the monitors are "Ready."

If it is determined that all the necessary monitors are ready at step 76, the tool then determines it has wireless communication capabilities at step 78. If the tool has wireless communication capabilities, the tool sends a burst of data to the server 61 via the wireless communication device 59 at step 80. The repair facility then receives a notification, such as an email or other type of notification that the vehicle is ready for inspection at step 82. The repair facility then contacts the vehicle operator to return the vehicle and the tool at step 84. The operator then returns the tool and schedules an I/M retest at step 90.

After the tool determines whether all the necessary monitors are ready, if the tool does not include wireless communication at step 78, the tool then notifies the vehicle operator through an audio and/or visual indicator at step 86 via the beeper 15 or indicator 17 that the vehicle is ready for emissions testing. Upon being notified, the vehicle operator returns to the facility at step 88 and returns the tool and schedules an I/M retest at step 90 ending the process. Alternatively, the tool can provide wireless notification and notifies the operator through audio and/or visual indications on another device.

Figure 5:
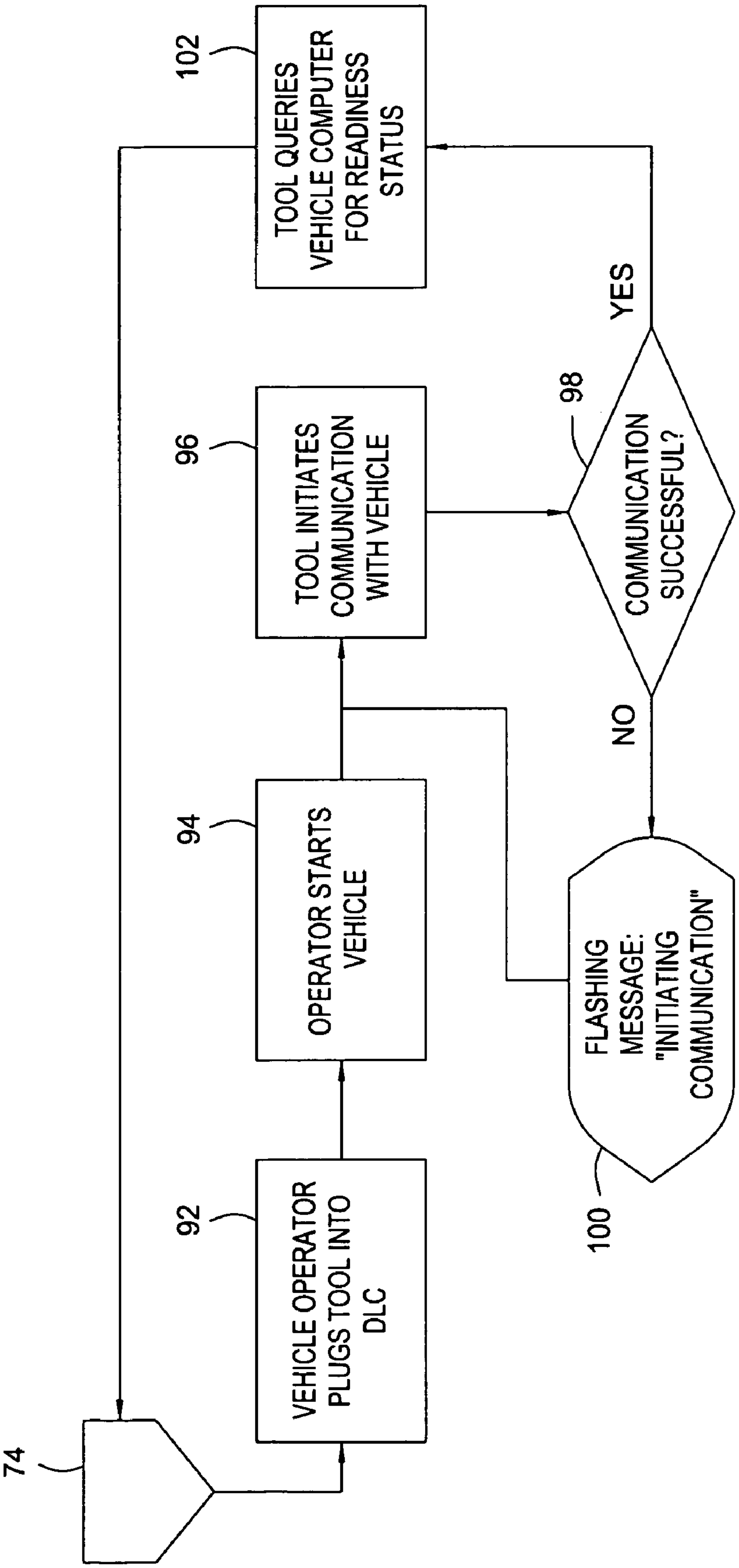
FIG. 5 is another flowchart illustrating steps in accordance with one embodiment of the method of the present invention.

FIG. 5 is another flowchart illustrating steps in accordance with one embodiment of the method of the present invention. During the period where the operator periodically checks the status at step 72, the vehicle operator plugs the tool into the diagnostic link connector at step 92 and starts the vehicle at step 94. The tool then initiates communication with the vehicle at step 96. If the tool has not initiated communication successfully at step 98 with the vehicle, the display indicates that the tool is still attempting to communicate with the vehicle at step 100 and returns to step 96. Once the communication is successful, the tool queries the vehicle's onboard computer to determine whether the vehicle is ready at step 102. If it is ready, then the tool 10 or 24 will proceed to step 76 via step 74.

Figure 6:
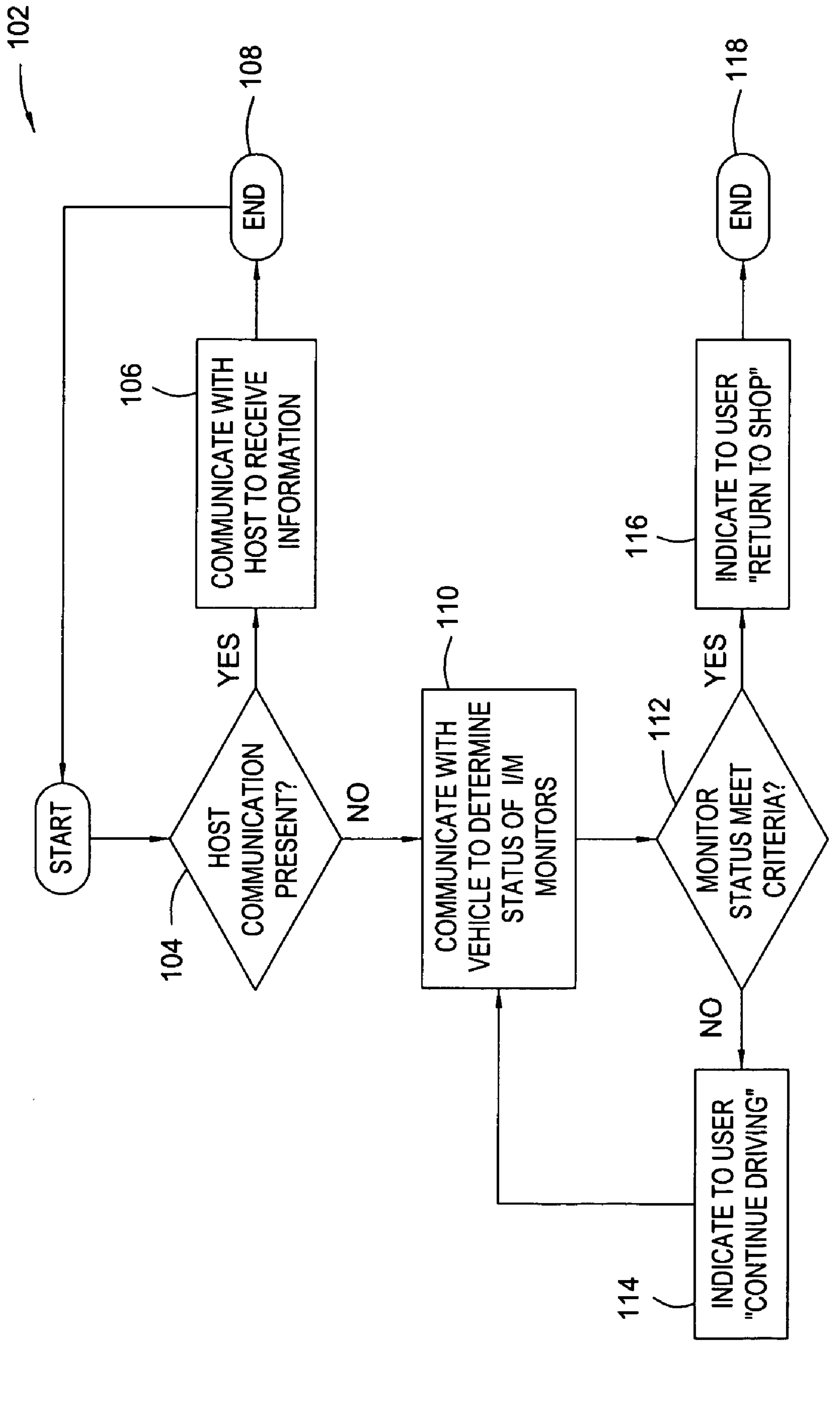
FIG. 6 is a flow chart illustrating the steps residing in the processor.

FIG. 6 is a flow chart illustrating the software program 102 residing in the processor 40. At step 104, when the tool is operational or on, the tool queries to see if a host computer is present. The host may be any computing device, such as, for example, a PC, a PDA or a scan tool that can be used to configure the tool. If host communication is present, the tool proceeds to communicate with the host to receive information, such as configuration data, updates or a new program at step 106. This may be new updates, for example, from an automobile manufacturer or software needed to communicate in a different communication protocol. Additionally, the tool can be configured to ignore certain readiness monitors that are always "off" due to certain conditions, such as environmental conditions that may never exist regardless of how many Drive Cycles are completed. Once the tool has been configured, the process ends at step 108. At this point, the user can power off the tool or unhook the tool from the host. The tool can then return to step 104.

However, if the tool determines that it is not communicating with the host, then it initiates communication with the vehicle's computer to determine the status of I/M monitors at step 110, then it proceeds to step 112 to determine whether the monitor status criteria has been met. If the criteria has not been met, the tool proceeds to step 114 where it indicates to the vehicle operator to "continue driving" on the display.

The "continue driving" indication may also be in the form of the beeper 15 or, for example, a light on the indicator 17, such as a red light. Also, this indication may be in the form of an in-action, in that there is no audible or visual indication through beeper 15 or indicator 17 in the event the criteria are not met and the vehicle operator has to continue driving. The tool then proceeds to 110 where it continues to communicate with the vehicle to determine the status of the I/M monitors and proceeds to step 112.

If the criteria has been met, the tool indicates to the vehicle operator that it is time to "return to the shop" at step 116. This indication may be had by way of, for example, an audible sound on the beeper 15 or a green light, or another type of visual indication on the indicator 17. Then the process ends at step 118. The "return to shop" signal may also be displayed alphanumerically on the display.

Although various configurations are possible, in an embodiment of the present invention, the beeper 15 may be a piezo-electric beeper having a variety of beeping mechanisms. The length and timing of beeps may be adjusted as desired. The indicator 17 may be a LED display or a plurality of LED displays. These LED indicators may flash on, turn off or held on continuously to indicate when the vehicle is "Ready" or "Not Ready."

Figure 7:
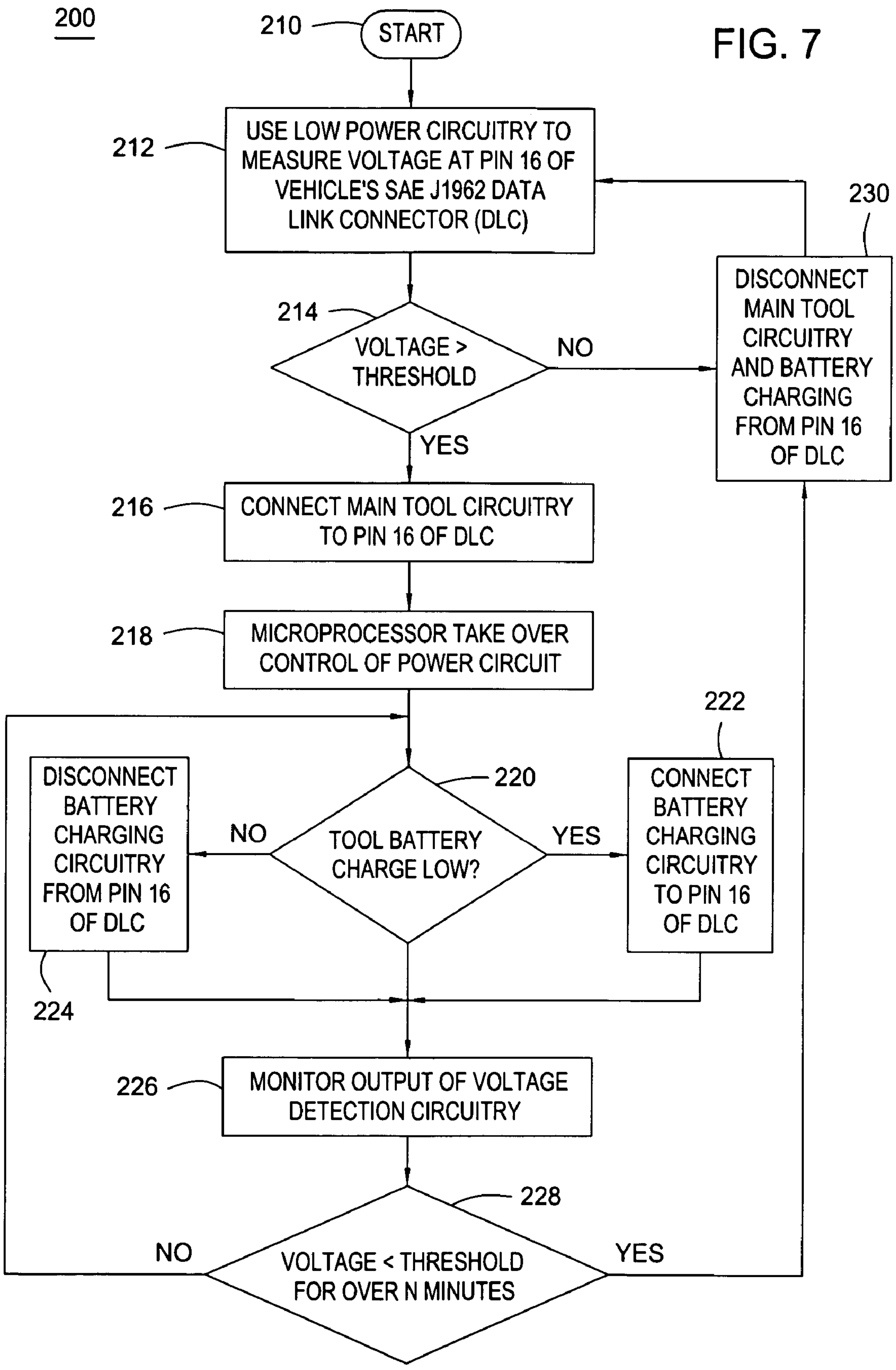
FIG. 7 is a flow chart of an embodiment of the tool having a discharge prevention circuit and device charging circuit.

As discussed above, the tool when plugged into the vehicle may drain the vehicle's battery. Software may be provided so that the tool can prevent itself from draining the vehicle's battery. FIG. 7 is a flow chart 200 of an alternative embodiment of the tool having a discharge prevention circuit and device charging circuit. The flow chart starts at 210 and proceeds to step 212, where the tool uses low-power voltage detection circuitry to measure the voltage at pin 16 of the data link connector. The low-power voltage detection circuitry draws only minimal power and does not significantly drain the power source when operating. The power source can be the vehicle's battery or the tool's internal battery. Thus, the tool can be hooked up to the vehicle for an extended period of time without the tool draining the vehicle's battery.

The connection described herein is based on SAE J1962, where pin 16 provides voltage information about the vehicle's battery. Pin 16 is but an example, other pins or connections are possible so long as the tool is connected to the proper pin or connection that provides information about the vehicle's battery, such as the battery's voltage.

At step 214, the tool determines if a threshold voltage has been reached. The threshold voltage can be any voltage, such as about 12.7V. The voltage of the vehicle's battery is detected by the tool and then the tool determines if the vehicle's battery voltage is above (or below) the threshold voltage. If the battery's voltage is below (or no) the threshold voltage then the tool, at step 230, disconnects the charging circuit and the main tool circuitry from the pin 16 so that the tool is not drawing power from the vehicle's battery to charge its own internal power source or to continue to operate. If the vehicle's battery voltage is above the threshold voltage, then the tool proceeds to step 216, where the tool connects the main tool circuitry to the pin 16, thereby allowing the tool to draw power from the vehicle's battery in order to perform its functions. At step 218, the tool's processor takes over control of the power circuitry. By utilizing the processor, the tool can perform other functions that can not be performed by the low-power voltage detection circuitry.

While performing its I/M readiness monitor functions, at step 220, the tool determines if the tool's battery charge is low. If yes, then at step 222, the tool connects the charging circuit to pin 16 to start recharging the tool's battery. Then the tool proceeds to step 226. If no, then at step 224, the tool can disconnect the charging circuitry from pin 16 so that the tool is not longer using the vehicle's battery to charge its own power source. Then the tool proceeds to step 226.

At step 226, the tool monitors the output of the voltage detection circuitry. At step 228, the tool determines whether the battery's voltage is less than the threshold voltage for a certain period of time. The processor will not relinquish its control to the low-power voltage detection circuitry until the voltage is below the threshold voltage for a certain period of time. The tool prevents itself from powering on and off simply because the threshold voltage is met or not met within a short period of time due to fluctuation in the battery's voltage. The fluctuation can occur when the vehicle is started and then turned off and then started again. The time period can be between about 1.0 to 2 minutes. However other time periods can be used. Thus, if yes, then the tool proceeds to step 230 where the tool disconnects the main tool and the charging circuitry from pin 16. If no, then the tool proceeds back to step 220.

Although the steps described herein are performed via software, it is contemplated by the invention that hardware or a combination of hardware and software can be used to perform the same or equivalent steps.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for determining a vehicle's readiness status for emissions testing, comprising:

a processor that can be operably coupled to a vehicle diagnostic connector to determine a status of at least one readiness monitor;

at least one vehicle communication protocol interface operatively coupled to the processor and allows the processor to communicate with the vehicle;

a voltage detection circuit to detect a voltage of a power source in the vehicle wherein the voltage detection circuit is low powered and detects whether the power source's voltage is at, above or below a threshold voltage;

a housing surrounding the processor, the at least one vehicle communication protocol interface, and the voltage detection circuit; and an indicator disposed on the housing for indicating the readiness of the vehicle for emission testing.

2. The apparatus in claim 1, further comprising a charging circuitry and a main tool circuitry, wherein the charging circuitry and the main tool circuitry draw power via a pin on the vehicle diagnostic connector.

3. The apparatus in claim 2, wherein the charging circuitry and main tool circuitry are disconnected from the power source when the power source's voltage is below the threshold voltage.

4. The apparatus in claim 2, wherein the charging circuitry and main tool circuitry are connected to the power source when the power source's voltage is above the threshold voltage.

5. The apparatus in claim 1, wherein the processor controls the apparatus when the power source's voltage is above the threshold voltage.

6. The apparatus in claim 5, wherein the processor relinquishes control of the apparatus to the voltage detection circuit when the power source's voltage is below the threshold voltage for a certain period of time.

7. The apparatus in claim 6, wherein the period of time is between about 1 minute to about 2 minutes.

8. A method of preventing a diagnostic tool from discharging a battery of a vehicle, comprising:

coupling the diagnostic tool that determines a vehicle's readiness status for emissions testing to a data link connector of the vehicle;

determining a voltage of the vehicle's battery with a voltage detection circuit of the diagnostic tool wherein the voltage detection circuit is low powered and detects whether the battery's voltage is at, above or below a threshold voltage;

comparing the voltage of the vehicle's battery against a threshold voltage with the voltage detection circuit of the diagnostic tool; and providing power to a processor of the diagnostic tool when the voltage of the vehicle's battery is above the threshold voltage.

9. The method of claim 8 further comprising disconnecting a main tool circuitry and a charging circuitry of the diagnostic tool when the vehicle's battery voltage is below the threshold voltage.

10. The method of claim 8, wherein when the processor is powered on, the processor takes over the diagnostic tool from the voltage detection circuit.

11. The method of claim 8, wherein when the processor is powered on, the processor determines the state of charge of the diagnostic tool's battery.

12. The method of claim 11, wherein when the diagnostic tool battery's charge is low, the diagnostic tool connects its charging circuitry to a pin on the data link connector and if the diagnostic tool battery's charge is high, the diagnostic tool disconnects its charging circuitry from the pin on the data link connector.

13. The method of claim 8, further comprising connecting a main tool circuitry and a charging circuitry of the diagnostic tool when the vehicle's battery voltage is above the threshold voltage.

14. A device for determining a vehicle's readiness status for emissions testing, comprising:

a means for processing that can be operably coupled to a vehicle diagnostic connector to determine a status of at least one readiness monitor;

means for communicating at least one vehicle communication protocol operatively coupled to the means for processing and allows the means for processing to communicate with the vehicle;

a means for detecting to detect a voltage of a power source in the vehicle wherein the means for detecting is low powered and detects whether the power source's voltage is at, above or below a threshold voltage;

a means for housing surrounding the means for processing, the means for communicating, and the means for detecting; and a means for indicating disposed on the housing, for indicating the readiness of the vehicle for emission testing.

15. The device of 14 further comprising a means for charging and means for drawing power, wherein the means for charging and means for drawing power draw power via a pin on the vehicle diagnostic connector.

16. The device in claim 15, wherein the means for charging and means for drawing power are disconnected from the power source when the power source's voltage is below the threshold voltage.

17. The device in claim 15, wherein the means for charging and means for drawing power are connected to the power source when the power source's voltage is above the threshold voltage.

18. The device in claim 14, wherein means for processing controls the device when the power source's voltage is above the threshold voltage.

19. The device in claim 18, wherein the means for processing relinquishes control of the device to the means for detecting when the power source's voltage is below a threshold voltage for the certain period of time.

* * * * *

UNITED STATES PATENT AND TRADEMARK OFFICE

CERTIFICATE OF CORRECTION

PATENT NO. : 8,370,016 B2
APPLICATION NO. : 11/522347
DATED : February 5, 2013
INVENTOR(S) : Thomas Webster et al.

It is certified that error appears in the above-identified patent and that said Letters Patent is hereby corrected as shown below:

Title page, Item (73) Assignee should read --SPX Corporation, Charlotte, NC (US)--

Signed and Sealed this
Ninth Day of April, 2013

Teresa Stanek Rea
*Acting Director of the United States Patent and Trademark Office*